July 22, 1969   H. KREMER   3,456,605
TORQUE-COMPENSATING SUPPORTING ARRANGEMENT
Filed Oct. 9, 1967

INVENTOR
Heinrich Kremer
BY Michael S. Striker
ATTORNEY

United States Patent Office 3,456,605
Patented July 22, 1969

3,456,605
TORQUE-COMPENSATING SUPPORTING
ARRANGEMENT
Heinrich Kremer, Krefeld, Germany, assignor to Vereingte
Kesselwerke Aktiengesellschaft, Dusseldorf, Germany
Filed Oct. 9, 1967, Ser. No. 674,022
Int. Cl. F23b 1/24; B65g 13/22
U.S. Cl. 110—35                           10 Claims

ABSTRACT OF THE DISCLOSURE

A main support has bearings supporting shafts driving drum grates of a garbage incinerator. The drive motors are supported only by their respective shafts so that the reaction torque to the load torque tends to turn the housings of the motors, which is prevented by a rigid connecting beam pivotally connected at two points to each housing so that no torque is transmitted to the main support.

Background of the invention

The present invention relates to a driving and supporting arrangement for the drive shafts of the drum grates of a garbage incinerator. It is known to mount drive motors whose weight and mass is in a certain ratio to the weight and mass of the shafts driven by the same without any additional support so that the weight of the drive motors is carried by the support of the bearings of the shaft. In order to transmit the driving torque to the shaft, the housing of the motor must be held since it is subjected to a reaction torque.

If a drive of this kind is to be used for driving the shafts of the drum grates of a garbage incinerator, considerable difficulties are encountered. In order to hold the motor housings against angular displacement by the reaction torque, anchoring means and brackets must be provided for each motor which are located outside of the combustion chamber and whose great weight would cause an intolerable stress on the supporting structure, unless the same is substantially reinforced which causes constructive diffculties and very high cost.

Summary of the invention

It is an object of the invention to overcome the disadvantages of prior art constructions, and to provide a torque compensating supporting arrangement of simple construction.

Another object of the invention is to provide a supporting arrangement for the drive means and shafts of an incinerator in which the main support is free of stresses caused by torques.

With these objects in view, one embodiment of the invention comprises a plurality of parallel shafts which are subjected to the load torque of drum grates; a plurality of motors having housings and drivng the shafts so that a reaction torque acts on each of the housings; connecting means connecting the housings and blocking rotation of the drive motors by the reaction torques; and a main support having a plurality of bearings supporting the shafts so that the main support carries the shafts, the drive means, and the connecting means. However, no torque is transmitted to the main support, since there is no connection between the motor housings and the main support.

In the preferred embodiment of the invention, the main support is a supporting beam, and the connecting means include a connecting beam parallel to the supporting beam and being connected to each motor housing by two spaced pivotal connections. In this manner, the motor housings are held even if the direction of rotation is changed.

Since the connecting beam is carried by the motor housings which rest on the shafts, the main support on which the entire structure is mounted, is subjected only to vertical forces. Force components acting in other directions are taken up by the connecting beam and do not subject the support beam to additional transverse stresses.

If necessitated by particular conditions, the connecting beam may be additionally supported. Any number of motor housings may be connected by the connecting beam, the number corresponding to the number of drum grates driven by the shafts.

It is particularly advantageous to make the pivotal connections between the connecting beam and the motor housings detachable so that each drive motor can be detached from the connecting beam, and drawn off the respective shaft with the connecting gears sliding in axial direction.

It is also advantageous to mount the bearings of the shafts detachably on the supporting beam which facilitates the removal of the shafts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Description of the preferred embodiments

Figures 1, 2:
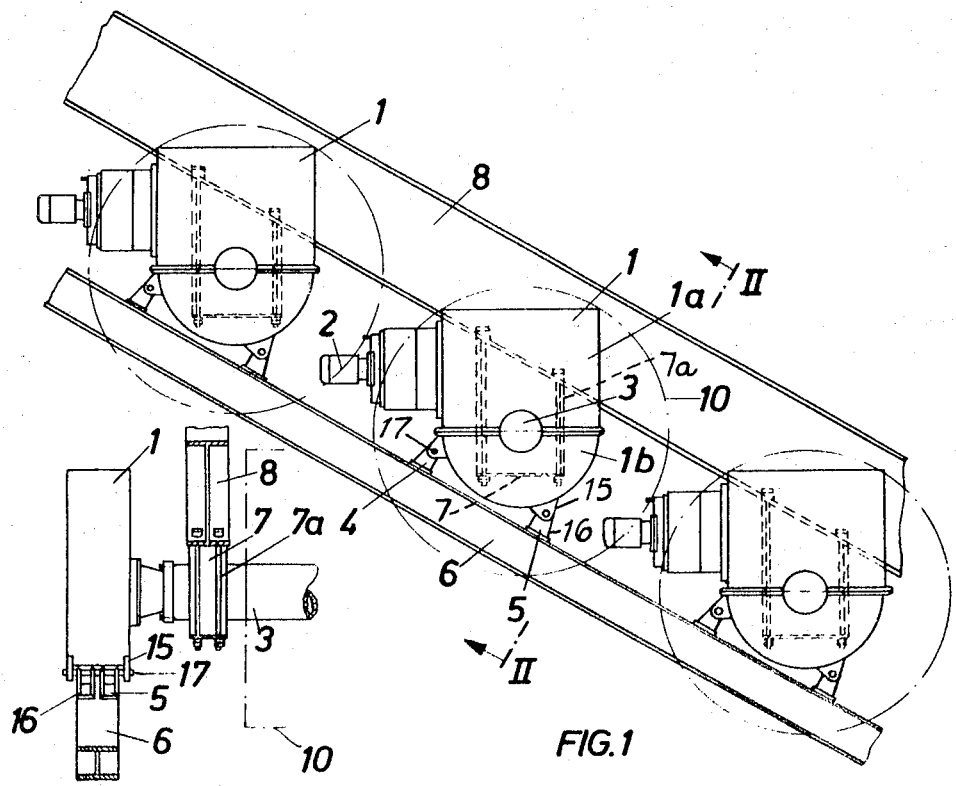
FIG. 1 is a fragmentary side elevation illustrating an embodiment of the invention for driving the drum grates of a garbage incinerator.
FIG. 2 is a fragmentary sectional view taken on line II—II in FIG. 1.

The drum grates 10 of a garbage incinerator are mounted on parallel drive shafts 3 whose axes are located in a common inclined plane. Each shaft 3 is supported at the ends thereof by bearings 7, and the bearings on opposite ends of the shafts are supported by a pair of supporting beams 8 which are parallel to the plane of the shafts and form a main support. FIG. 2 shows only one end of a shaft, and one of the beams 8 with the bearing 7. Detachable means in the form of a pair of bolts 7a attach each bearing 7 to the respective supporting beam 8 so that the bearings and shafts can be detached from the main support constituted by the two parallel supporting beams 8 at the opposite ends of shafts 3.

A drive means 1 is mounted on each shaft 3, and includes a housing frame having two housing portions 1a and 1b, a motor 2, and whose stator is secured to the housing portion 1a, and whose rotor is connected to the respective shaft 3 by a transmission, not shown, in the housing 1a, 1b for transmitting the drive torque of motor 2 to shaft 3. The transmission is constructed to permit a separation between the motor and the respective shaft.

A connecting beam 6 extends parallel to beams 8 and to the plane of the shafts 3. Each housing portion 1b is connected by attaching means including a pair of connectors 4 and 5 with two points spaced along the length of connecting beam 6. Each connector includes a pair of brackets 15 connected to housing part 1b, two pairs of brackets 16 secured to connecting beam 6, and a pivot pin 17 passing through bores of the brackets, and being detachably secured.

When the pivot pins 17 are detached, the connecting beam 6 can be removed, permitting a removal of the entire drive means 1 from the respective shaft 3.

The entire weight of connecting means 4, 5, 6, drive means 1, shafts 3, and bearing 7a is carried by the main support consisting of the two supporting beam 8, but drive means 1 have no other support than shafts 3.

When motors 2 are operated and drive through shafts 3 the drum grates 10, the drive torque required for overcoming the load torque of the drum grates, produces a reaction torque tending to rotate the housings 1a, 1b about shafts 3. Such undesired rotation is blocked by the rigid connecting beam 6 which takes up all the torques produced in this manner on the housings and is subjected to corresponding bending stresses. However, since there is no connection between the housings 1a, 1b and connecting beam 6 with the adjacent support beam 8 of the main support, the support beam 8 is not subjected to torques causing bending stresses.

The drive and supporting arrangement of the invention is located at the ends of shaft 3, outside of the combustion chamber in which the drum grates 10 are located.

It will be undestood that each of the elements described above, or two or more together, may also find a useful application in other types of torque compensating arrangements differing from the types described above.

While the invention has been illustrated and described as embodied in a torque compensating supporting and driving arrangement in which a rigid connecting means connects housings of motors which are supported only on the shafts driven by the same, it is not intended to be limited to the details shown, since various modifications and structural changes may be made without departing in any way from the spirit of the present invention.

What is claimed as new and desired to be protected by Letters Patent is set forth in the appended claims.

I claim:

1. Torque compensating supporting arrangement comprising, in combination, a plurality of shaft means; means driven by said shaft means and applying a load torque to the same; a main support; a plurality of bearing means mounted on said main support and rotatably supporting said shaft means, respectively; a plurality of drive means carried by said shaft means, respectively, each drive means including a housing frame means, and a motor having a stator secured to said housing frame means and a rotor in driving connection with the respective shaft means so that a reaction torque acts on each of said housing frame means to turn the same opposite to the direction of rotation of the respective shaft means; and connecting means spaced from said main support and connected with each of said housing frame means for connecting the same to each other so that turning of said housing frame means due to reaction torques is blocked by said connecting means and no torque is transmitted from said drive means to said main support, whereas the weight of said bearing means, shaft means, and drive means rests on said main support.

2. Torque compensating supporting arrangement as claimed in claim 1 wherein said shaft means and bearing means have parallel axes located in the same plane; wherein said main support includes a first beam parallel to said plane; and wherein said connecting means includes a second beam parallel to said plane.

3. Torque compensating supporting arrangement as claimed in claim 2 wherein said plane and said first and second beams are slanted to a vertical plane.

4. Incinerator with torque-compensating supporting arrangement as claimed in claim 3 wherein said drive means are respectively located at the ends of said shaft means; wherein said bearing means and said first beam are located closely spaced from said ends so that said first and second beams are spaced a short distance in axial direction of said shaft means; and comprising drum shaped grates secured to the central portion of said shaft means.

5. Torque-compensating supporting arrangement as claimed in claim 1 wherein said drive means, bearing means, main support and connecting means are located at the same ends of said shaft means; and comprising attaching means detachably connecting said housing frame means with said connecting means; and wherein said drive means include separable transmission means connecting said motors with said shaft means so that said drive means can be detached from said shaft means.

6. Torque-compensating supporting arrangement as claimed in claim 5 comprising means for detachably attaching said bearing means to said main support so that said bearing means and shaft means can be detached from said main support and from each other.

7. Torque-compensating supporting arrangement as claimed in claim 1 wherein said connecting means include a rigid connecting member extending past said frame means of said drive means, and a plurality of connecting means including pivots and respectively connecting said rigid connecting member with said frame means.

8. Torque-compensating supporting arrangement as claimed in claim 7 wherein each of said pivotal connecting means includes two connectors including pivots and spaced along said rigid connecting member and connecting the same with two spaced points of each of said housing frame means of said drive means for opposing reaction torques acting in opposite directions and caused by rotation of said shaft means by said drive means in opposite directions.

9. Torque-compensating supporting arrangement as claimed in claim 1 wherein said housing frame means of each of said drive means includes a divided housing for the respective motor.

10. Incinerator with torque-compensating supporting arrangement as claimed in claim 1 wherein said shaft means and bearing means have parallel axes located in the same plane; wherein said main support includes a first beam parallel to said plane; wherein said connecting means includes a second beam parallel to said plane; wherein said plane and said first and second beams are slanted to a vertical plane; wherein said drive means are respectively located at the ends of said shaft means; wherein said bearing means and said first beam are located closely spaced from said ends so that said first and second beams are spaced a short distance in axial direction of said shaft means; comprising drum shaped grates secured to the central portions of said shaft means; wherein said drive means, bearing means, main support and connecting means are located at the same ends of said shaft means; and comprising attaching means detachably connecting said housing frame means with said second beam of said connecting means; wherein said drive means include separable means connecting said motors with said shaft means so that said drive means can be detached said shaft means; and wherein said attaching means include a plurality of pairs of connecting means respectively connecting two spaced points of each housing frame with said second beam.

References Cited

UNITED STATES PATENTS

| 1,725,740 | 8/1929 | Schulte | 198—127 |
| 2,176,039 | 10/1939 | Umansky. | |
| 2,608,286 | 8/1952 | Henschker. | |
| 3,258,001 | 6/1966 | Virgil. | |

FOREIGN PATENTS 926,428 5/1963 Great Britain.

JAMES W. WESTHAVER, Primary Examiner

U.S. Cl. X.R.

110—7; 198—127; 248—24